(12) United States Patent
Goel et al.

(10) Patent No.: US 9,787,527 B1
(45) Date of Patent: Oct. 10, 2017

(54) SYSTEM, METHOD, AND COMPUTER PROGRAM FOR NETWORK CONNECTIVITY POLICY EXCHANGE BASED ON A LOCATION OF A MOBILE DEVICE

(71) Applicant: Amdocs Software Systems Limited, Dublin (IE)

(72) Inventors: Sapan Goel, Gurgaon (IN); Cedric Gegout, Rennes (FR)

(73) Assignees: Amdocs Development Limited, Limassol (CY); Amdocs Software Systems Limited, Dublin (IE)

(*) Notice: Subject to any disclaimer, the term of this patent is extended or adjusted under 35 U.S.C. 154(b) by 239 days.

(21) Appl. No.: 14/290,730

(22) Filed: May 29, 2014

(51) Int. Cl.
| | |
|---|---|
| H04L 29/06 | (2006.01) |
| H04W 12/08 | (2009.01) |
| H04W 36/14 | (2009.01) |
| H04W 48/14 | (2009.01) |
| H04W 48/18 | (2009.01) |
| H04W 4/02 | (2009.01) |
| H04L 12/24 | (2006.01) |
| H04W 36/32 | (2009.01) |
| H04W 36/24 | (2009.01) |
| H04L 12/26 | (2006.01) |

(52) U.S. Cl.
CPC .......... H04L 41/00 (2013.01); *H04L 43/08* (2013.01); *H04L 63/105* (2013.01); *H04L 63/18* (2013.01); *H04L 63/20* (2013.01); *H04W 12/08* (2013.01); *H04W 36/24* (2013.01); *H04W 36/32* (2013.01); *H04W 48/18* (2013.01)

(58) Field of Classification Search
CPC ..... H04W 12/08; H04W 12/06; H04W 4/001; H04W 4/02; H04W 36/14; H04W 36/24; H04W 36/32; H04W 40/20; H04W 4/021; H04W 4/028; H04L 47/14; H04L 47/20
See application file for complete search history.

(56) References Cited

U.S. PATENT DOCUMENTS

| | | | | |
|---|---|---|---|---|
| 7,978,691 | B1* | 7/2011 | Cole ..................... | H04W 40/24 370/252 |
| 8,660,536 | B1* | 2/2014 | Pogue .................. | H04W 88/10 455/411 |
| 2006/0094400 | A1* | 5/2006 | Beachem ............. | H04L 63/101 455/410 |
| 2013/0122910 | A1* | 5/2013 | Singh ................... | H04W 36/14 455/437 |
| 2013/0254831 | A1* | 9/2013 | Roach .................. | H04L 63/107 726/1 |

(Continued)

*Primary Examiner* — Hee Soo Kim
*Assistant Examiner* — Ho Shiu
(74) *Attorney, Agent, or Firm* — Zilka-Kotab, PC

(57) ABSTRACT

A system, method, and computer program product are provided for network connectivity policy exchange based on a location of a mobile device. In use, a location of a mobile device associated with at least one network is identified based on a message received by the mobile device. Additionally, one or more network connectivity policies applicable to the mobile device are identified, the one or more network connectivity policies being identified based on one or more parameters and a predefined radial distance from the location of the mobile device. Further, the one or more network connectivity policies are sent to the mobile device.

6 Claims, 5 Drawing Sheets

(56) References Cited

U.S. PATENT DOCUMENTS

| | | | |
|---|---|---|---|
| 2013/0295902 A1* | 11/2013 | Justen | H04W 8/22 455/418 |
| 2014/0007222 A1* | 1/2014 | Qureshi | G06F 21/10 726/16 |
| 2014/0194094 A1* | 7/2014 | Ahuja | G06F 21/53 455/410 |
| 2014/0248852 A1* | 9/2014 | Raleigh | H04M 15/723 455/407 |
| 2015/0128205 A1* | 5/2015 | Mahaffey | H04L 63/20 726/1 |
| 2016/0337950 A1* | 11/2016 | Navas Cornejo | H04W 48/14 |

* cited by examiner

SYSTEM, METHOD, AND COMPUTER PROGRAM FOR NETWORK CONNECTIVITY POLICY EXCHANGE BASED ON A LOCATION OF A MOBILE DEVICE

FIELD OF THE INVENTION

The present invention relates to heterogeneous networks, and more particularly to efficiently communicating connectivity policies to devices in such networks.

BACKGROUND

Network connectivity policies are used to recommend access networks to mobile devices. Providing the connectivity policies in a manner that guarantees an efficient implementation by a system handling millions of subscribers and that optimizes network usage and computation on the mobile devices is a challenge for network solution vendors.

As an example, typically all policies for an entire network are sent to all devices associated with the network, whenever there is any change in the connectivity policies. However, in case of networks with a large number of policies, this approach is not efficient because a large amount of data is required to be transferred.

There is thus a need for addressing these and/or other issues associated with the prior art.

SUMMARY

A system, method, and computer program product are provided for network connectivity policy exchange based on a location of a mobile device. In use, a location of a mobile device associated with at least one network is identified based on a message received by the mobile device. Additionally, one or more network connectivity policies applicable to the mobile device are identified, the one or more network connectivity policies being identified based on one or more parameters and a predefined radial distance from the location of the mobile device. Further, the one or more network connectivity policies are sent to the mobile device.

DETAILED DESCRIPTION

Figure 1:
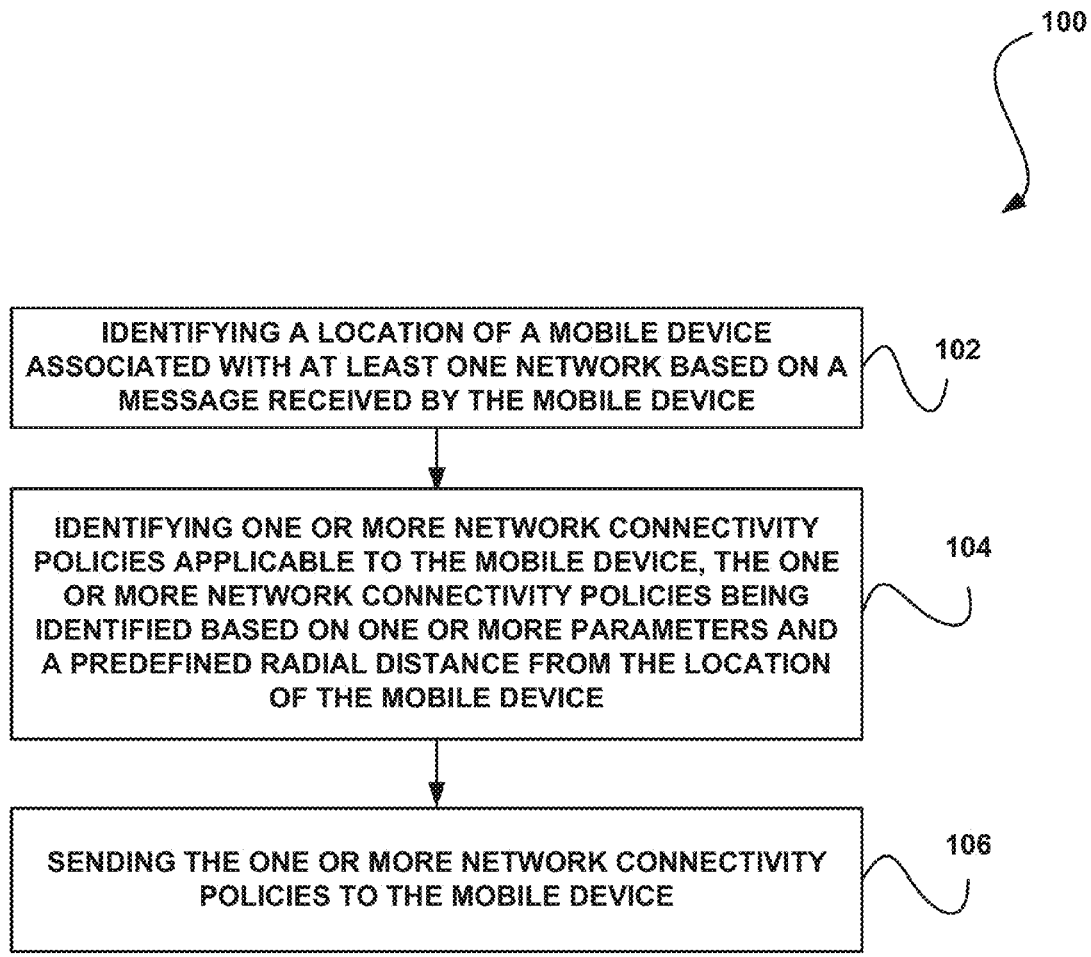
FIG. 1 illustrates a method for network connectivity policy exchange based on a location of a mobile device, in accordance with one embodiment.

FIG. 1 illustrates a method 100 for network connectivity policy exchange based on a location of a mobile device, in accordance with one embodiment.

As shown, a current location of a mobile device associated with at least one network is identified based on a message received by the mobile device. See operation 102. The mobile device may include any type of mobile device. For example, in various embodiments, the mobile device may include a mobile phone, a tablet computer, a laptop computer, a handheld computer, and/or any other type of mobile device.

The network may include any type of network. For example, the network may include a cellular network, a Wi-Fi network, or any Heterogeneous-Network (HetNet).

Further, the message received by the mobile device may include any communication capable of indicating a current location of the mobile device. For example, in one embodiment, the message may include an Open Mobile Alliance (OMA) Device Management (DM) message.

As shown further in FIG. 1, one or more network connectivity policies applicable to the mobile device are identified. In this case, the one or more network connectivity policies are identified based on one or more parameters and a predefined radial distance from the location of the mobile device. See operation 104.

Further, the one or more network connectivity policies are sent to the mobile device. See operation 106. In various embodiments, sending of the network connectivity policies may be result of a push operation (e.g. initiated by a server) or a pull operation (e.g. initiated by the mobile device). In the context of the present description, a network connectivity policy refers to any policy that recommends access networks to devices associated with the network.

In one embodiment, the identified network connectivity policies may be a portion of a plurality of available network connectivity policies. Furthermore, the parameters used to identify the applicable network connectivity policies may include various parameters.

For example, in one embodiment, the parameters may include a policy configuration parameter. In another embodiment, the parameters may include subscriber information (e.g. information associated with the mobile device and/or a user of the mobile device, etc.). In another embodiment, the parameters may include current usage information (e.g. current usage information associated with the mobile device and/or a user of the mobile device, etc.).

Further, in one embodiment, identifying the network connectivity policies applicable to the mobile device may include identifying network connectivity policies that are valid within an area defined by the predefined radial distance from the location of the mobile device. In this case, in one embodiment, a virtual region may be identified based on the predefined radial distance from the location of the mobile device.

In the context of the present description, a virtual region refers to any area (e.g. on a map overlay, etc.) defined utilizing a location of the mobile device, such that applicable connectivity policies may be identified.

The virtual region may be utilized to identify the one or more network connectivity policies applicable to the mobile device. In this case, identifying the network connectivity policies applicable to the mobile device may include identifying network connectivity policies that overlap the virtual region.

In another embodiment, a virtual policy may be sent to the mobile device. In this case, the virtual policy may specify a virtual region based on the location of the mobile device (e.g. based on the radial distance from the current location, etc.). The valid network connectivity policies may include policies that are valid in the virtual region. In one embodiment, the virtual policy may include additional information, such as information associated with policy expiration times.

Further, in one embodiment, the method 100 may include receiving an indication that the mobile device has moved outside of the virtual region. For example, another message may be received indicating a new current location of the mobile device, which is outside of the initially defined virtual region. In this case, other network connectivity policies applicable to the mobile device may be identified based on the new identified location of the mobile device. These other network connectivity policies may be sent to the mobile device.

Still yet, in one embodiment, the identified location of the mobile device may be stored in a Big Data System (BDS), along with any other identified locations associated with the mobile device. In this case, various data analytics processes may be performed utilizing data stored in the Big Data System to predict movements of the mobile device and determine additional applicable network connection policies.

In operation, the method 100 may be implemented by a system for connectivity policy exchange between a mobile client and server using an Access Network Discovery and Selection Function (ANDSF).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The 3GPP specifications define a mechanism for connectivity policy exchange between a mobile client and server using ANDSF. The connectivity policy indicates the recommended access networks according to the mobile device location and the current time.

In various embodiments, a connectivity policy may be exchanged using a push mechanism or a pull mechanism. For a push, an ANDSF Server (AS) detects changes in a connectivity policy and pushes the new/updated policy towards a client. For a pull, an ANDSF client (AC) detects that the current policy may not be up-to-date and the ANDSF client tries to pull a new policy from the ANDSF Server.

As policy exchange is expected to be driven by a Heterogeneous-Network Operator, 3GPP specifications do not define the triggers to initiating the push and/or pull procedure. This is left for an implementation to decide. For a Network Solution Vendor, it brings a lot of value to propose a mechanism that can guarantee an efficient behavior of the system in any situations.

As per 3GPP specifications, an ANDSF client receives the policies (e.g. using pull or push mechanisms) and then, based on an evaluation of policies, selects the appropriate network for data connectivity. In one implementation, the ANDSF server sends all policies (e.g. for an entire network) to all the ANDSF Clients whenever there is any change in the server policies.

For that, the ANDSF server triggers the push mechanisms to update the policies on the ANDSF clients. However, in the case of networks with a large number of policies, this approach might not be practical as it will require lot of data to be transferred and will require a large amount of memory (e.g. for storing) and processing (e.g. to select the relevant policies) on the mobile device.

Thus, it is desirable to send a limited set of policies that are currently relevant for a mobile device (e.g. referred to as User Equipment [UE]) and an associated user in a way that optimizes the mobile device resources (e.g. network usage, computation, memory, etc.). In terms of implementation, this means that the ANDSF client needs to have some mechanism to know when it should trigger a connectivity policy pull.

Figure 2:
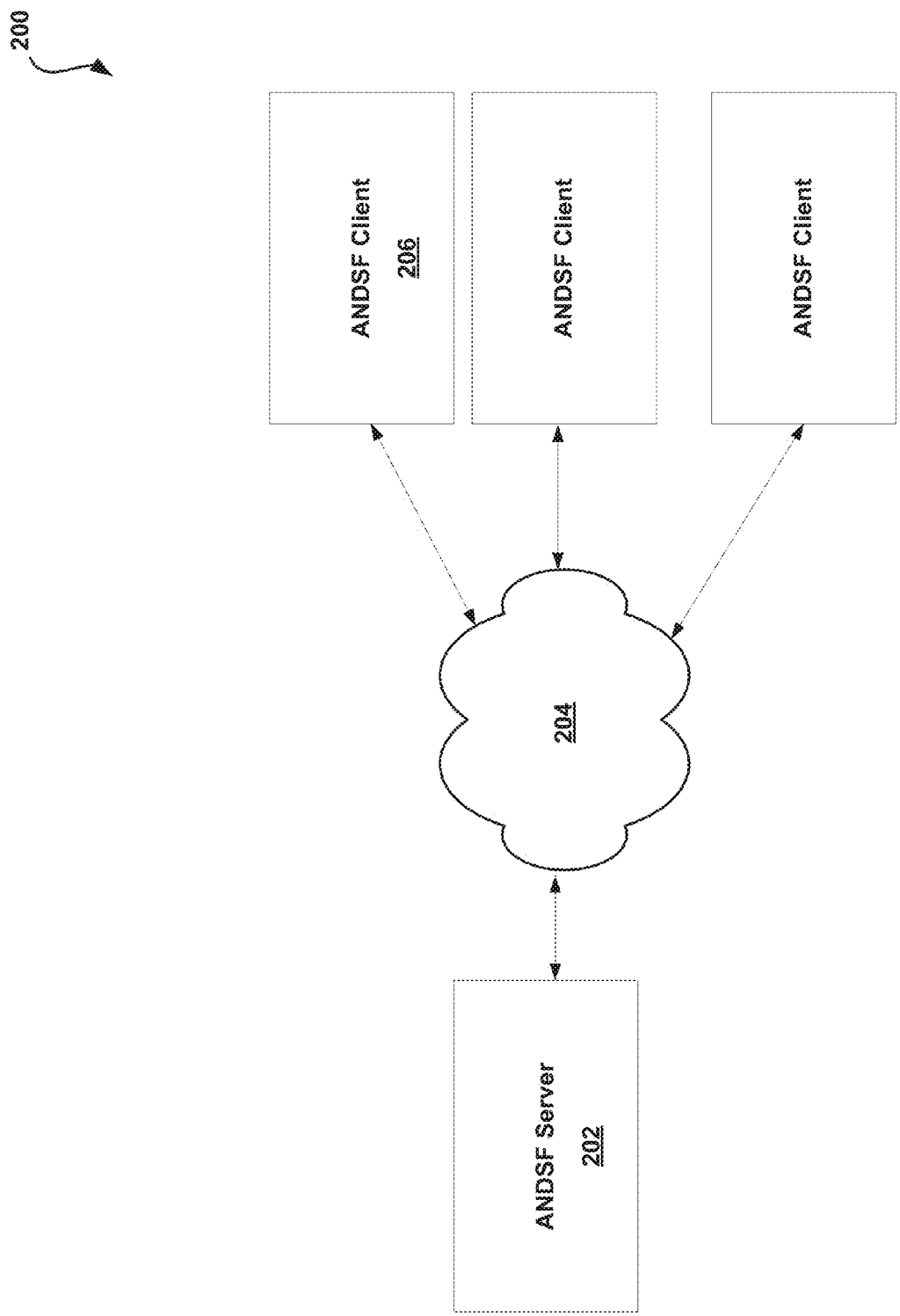
FIG. 2 illustrates a functional block diagram of a system for network connectivity policy exchange based on a location of a mobile device, in accordance with one embodiment.

FIG. 2 illustrates a functional block diagram of a system 200 for network connectivity policy exchange based on a location of a mobile device, in accordance with one embodiment. As an option, the system 200 may be implemented in the context of the details of FIG. 1. Of course, however, the system 200 may be implemented in the context of any desired environment. Further, the aforementioned definitions may equally apply to the description below.

As shown, the system 200 includes an ANDSF server 202 in communication with one or more ANDSF clients 206, which may include various mobile devices and user equipment, over one or more networks 204. In a standardized and nominal flow, when an ANDSF client 206 sends an OMA DM message (e.g. defined on an S14 interface) to request for connectivity policies from the network 204, the ANDSF client 206 sends its current location in the message.

On the basis of the received mobile device location, the ANDSF server 202 determines a list of policies applicable for the ANDSF client 206. The ANDSF server 202 sends out the policies based on various parameters (e.g., such as policy configuration, subscriber information, current usage information, etc.). In addition to these parameters, the ANDSF server 202 also considers the current ANDSF client 206 location and only sends out the policies that are valid within a predefined radius X of the identified location (e.g. in miles, kilometers, meters, etc.).

In one embodiment, the ANDSF server 202 may create a Virtual Region (VR) that maps to an area based on the radius X around reported current ANDSF client 206 location. In this case, the ANDSF server 202 may identify/determine the relevant set of valid policies that overlap in the region and return this list to the ANDSF client 206.

Additionally, in one embodiment, the ANDSF server 202 may send a "ghost policy" or virtual policy to the ANDSF client 206 that includes a rule that specifies the virtual region for the ANDSF client 206. In another embodiment, information may be included in the ghost/virtual policy to inform the ANDSF client 206 about policy expiration times, or any of the limitations that will cause the ANDSF client 206 to request other policies.

In operation, the ANDSF client 206 may identify the ghost policy or virtual policy, while processing the received policies, and store the validity area information received in the virtual policy as the region for which it has received policy information. When the ANDSF client 206 detects that it has moved out of validity area of ghost policy, the ANDSF client 206 may initiate the policy pull again and thus obtain a new set of policies.

Figure 3:
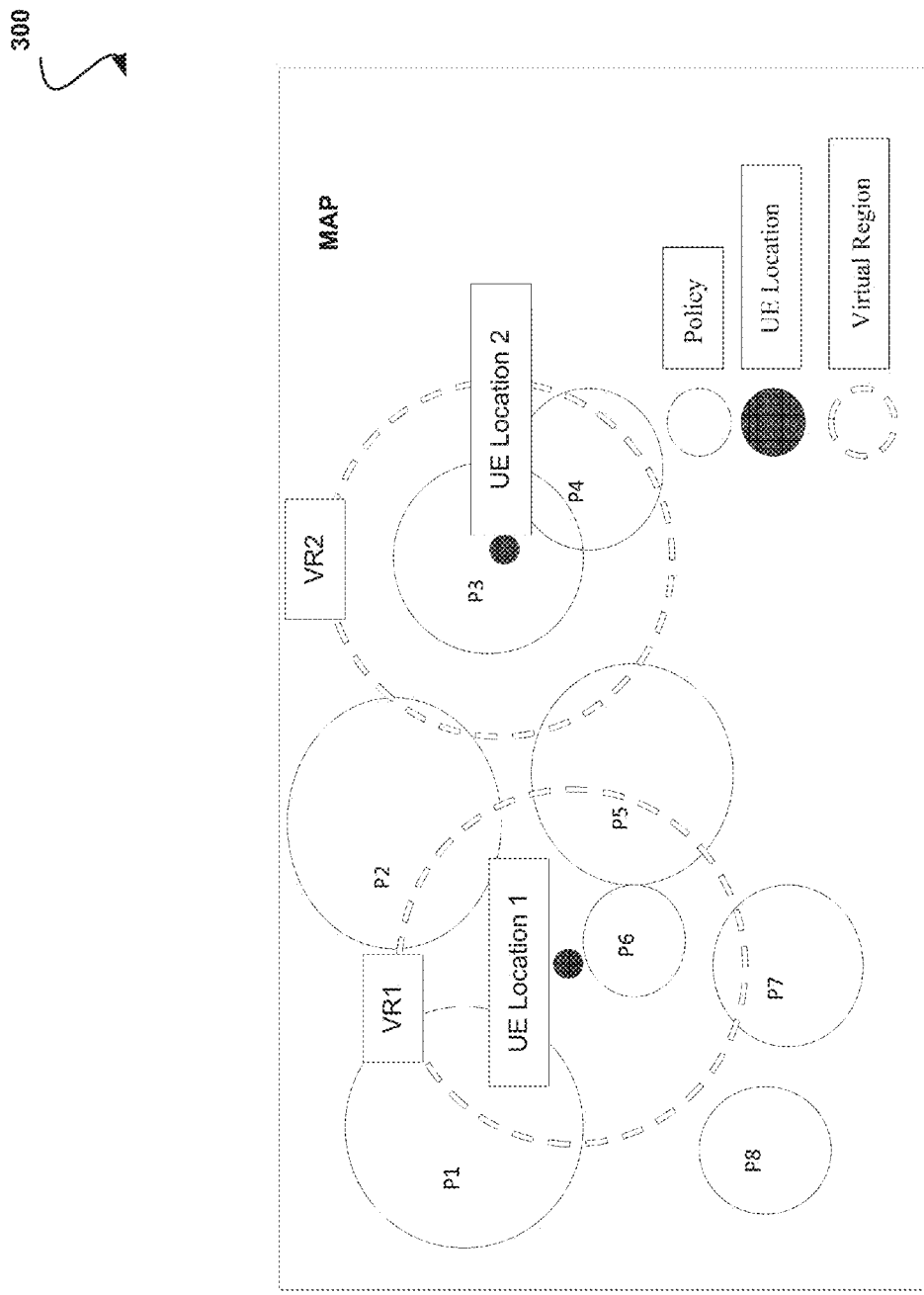
FIG. 3 illustrates an example of network connectivity policy exchange based on a location of a mobile device, in accordance with one embodiment.

FIG. 3 illustrates an example 300 of network connectivity policy exchange based on a location of a mobile device, in accordance with one embodiment. As an option, the example 300 may be viewed in the context of the details of the previous Figures. Of course, however, the example 300 may be viewed in the context of any desired environment. Further, the aforementioned definitions may equally apply to the description below.

As shown in FIG. 3, a Heterogeneous-Network Operator has configured network connectivity policies P1 to P8 for different areas. For a mobile device at UE Location 1, an ANDSF server will create a virtual region denoted by a first virtual region "VR1" and will send overlapping policies (P1, P2, P5, P6, P7, and a ghost policy) to the mobile device. The validity area of ghost policy will denote VR1.

As soon as the mobile device moves out of the first virtual region VR1, the mobile device will determine that it has no "ghost policy" compliant with where it is positioned. The mobile device will then request a connectivity policy from the ANDSF server.

Similarly, for a mobile device at "UE Location 2", the ANDSF server will create a virtual region denoted by VR2 and will send overlapping policies (P3, P4, P5 and a ghost policy) to the mobile device. The validity area of the ghost policy will denote VR2.

In one embodiment, all of the received mobile device locations may be stored in a Big Data System. The Big Data System may run data analytics processes that can predict and anticipate the movements of the mobile devices and also determine where network congestions may be occurring. By requesting these predictions from the Big Data System, the ANDSF server may be able to send out additional policies applicable for each specific mobile device. These additional policies may prevent the corresponding mobile device to retrieve policies later.

Utilizing the techniques described herein optimizes network usage and optimizes computation and storage requirements on the mobile devices.

Typical existing solutions are based on sending all the policies to the client. Utilizing the techniques described herein, a limited set of policies may be sent to the client and the client may be capable of determining which policies are no longer valid, such that a pull of another connectivity policy may be triggered.

Figure 4:
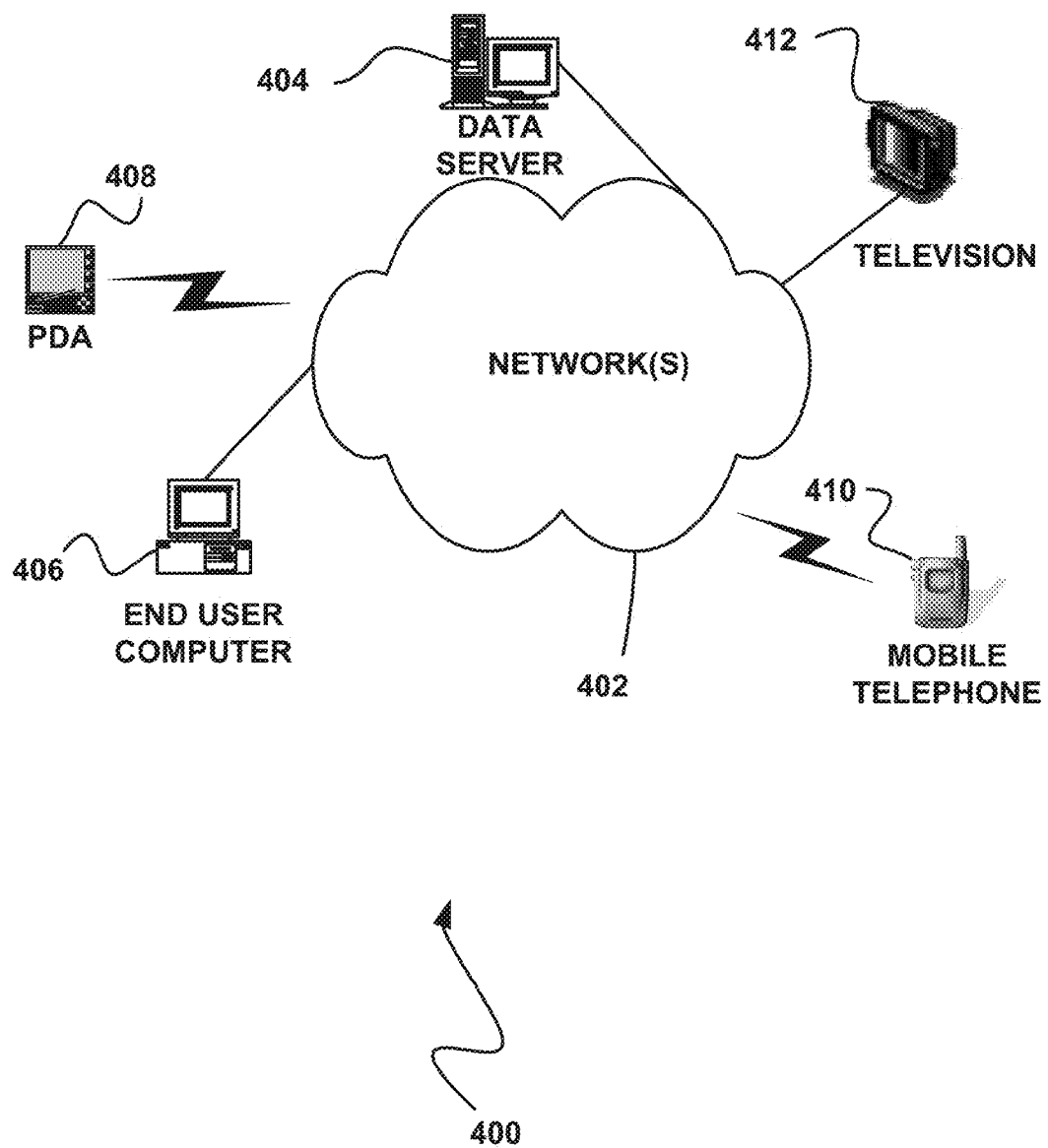
FIG. 4 illustrates a network architecture, in accordance with one possible embodiment.

The 3GPP ANDSF standard is relatively new and systems generally define a policy for a large area and send a new policy for all users in the area whenever the policy needs to be updated. In these systems, the server needs to send policy updates to a large population of subscribers inducing large data consumption in the Heterogeneous-Network. Thus, the techniques described herein may be utilized by systems for optimizing data transfer between an ANDSF client and server FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
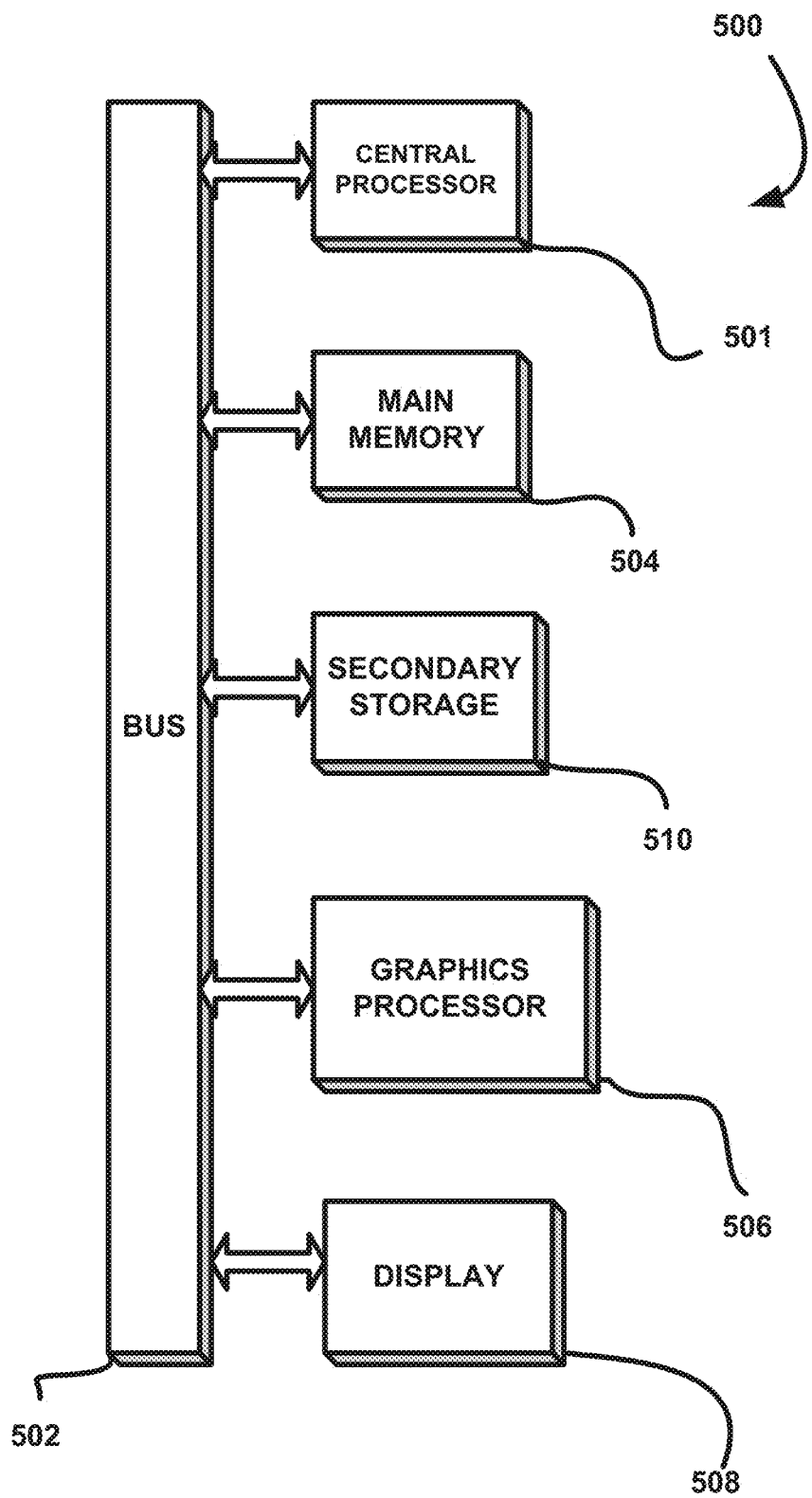
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:

computer code for identifying, by a system, a location of a mobile device on a network based on a message received by the mobile device, wherein the system and the mobile device are remotely connected via the network;

computer code for determining, by the system, a virtual region that is an area surrounding the location of the mobile device having a radius of a predefined size;

computer code for accessing, by the system, a plurality of predefined network connectivity policies that each recommend a plurality of access networks;

computer code for identifying, by the system from the predefined network connectivity policies, one or more of the network connectivity policies that each recommend a plurality of access networks that overlap with, and accordingly are valid for, the virtual region, wherein the one or more of the network connectivity policies are further identified based on parameters including:

subscriber information including information associated with the mobile device and a user of the mobile device, and current usage information associated with the mobile device;

computer code for sending, by the system, to the mobile device:

the one or more network connectivity policies for use by the mobile device in selecting one of the plurality of recommended access networks of any of the one or more network connectivity policies for establishing a connection thereto, and a virtual policy including:

an indication of the virtual region as a validity area for the virtual policy which is for use in triggering the mobile device to request one or more new network connectivity policies when the mobile device moves to a second location outside of the virtual region and determines that it does not have another virtual policy compliant with the second location, and policy expiration times for the one or more network connectivity policies:

computer code for receiving, by the system from the mobile device, a request for the one or more new network connectivity policies responsive to the mobile device moving to the second location outside of the virtual region and determining that it does not have the other virtual policy compliant with the second location;

computer code for identifying, by the system, the second location of the mobile device based on the request received from the mobile device, computer code for determining, by the system, a second virtual region that is an area surrounding the second location of the mobile device having the radius of the predefined size;

computer code for accessing, by the system in response to the request, the plurality of predefined network connectivity policies that each recommend the plurality of access networks, computer code for identifying, by the system from the predefined network connectivity policies, the one or more new network connectivity policies that each recommend a plurality of new access networks that overlap with, and accordingly are valid for, the second virtual region, wherein the one or more of the new network connectivity policies are further identified based on the parameters, computer code for sending, by the system, to the mobile device:
  the one or more new network connectivity policies for use by the mobile device in selecting one of the plurality of newly recommended access networks of any of the one or more new network connectivity policies for establishing a connection thereto, and
  a second virtual policy including:
    an indication of the second virtual region as a validity area for the second virtual policy which is for use in triggering the mobile device to request one or more further new network connectivity policies when the mobile device moves to a third location outside of the second virtual region and determines that it does not have a further virtual policy compliant with the third location, and
    policy expiration times for the one or more new network connectivity policies.

2. The computer program product of claim 1, further comprising computer code for storing the identified location of the mobile device in a Big Data System (BDS), along with other identified locations associated with the mobile device.

3. The computer program product of claim 1, wherein the computer program product is operable such that the at least one network includes a cellular network or a Wi-Fi network.

4. The computer program product of claim 1, further comprising:
  computer code for storing, by the system, the location of the mobile device and the second location of the mobile device with a history of locations of the mobile device and other mobile devices on the network;
  computer code for performing, by the system, an analytics process utilizing the location of the mobile device, the second location of the mobile device, and the history of locations of the mobile device and the other mobile devices to predict movement of the mobile device and to predict where network congestions are occurring;
  computer code for determining, by the system from the analytics process, additional network connectivity policies for the mobile device associated with the predicted movement of the mobile device; and
  computer code for sending, by the system, the additional network connectivity policies to the mobile device.

5. A method, comprising:
  identifying, by a system, a location of a mobile device on a network based on a message received by the mobile device, wherein the system and the mobile device are remotely connected via the network;
  determining, by the system, a virtual region that is an area surrounding the location of the mobile device having a radius of a predefined size;
  accessing, by the system, a plurality of predefined network connectivity policies that each recommend a plurality of access networks;
  identifying, by the system from the predefined network connectivity policies, one or more of the network connectivity policies that each recommend a plurality of access networks that overlap with, and accordingly are valid for, the virtual region, wherein the one or more of the network connectivity policies are further identified based on parameters including:
    subscriber information including information associated with the mobile device and a user of the mobile device, and
    current usage information associated with the mobile device;
  sending, by the system, to the mobile device:
  the one or more network connectivity policies for use by the mobile device in selecting one of the plurality of recommended access networks of any of the one or more network connectivity policies for establishing a connection thereto, and
  a virtual policy including:
    an indication of the virtual region as a validity area for the virtual policy which is for use in triggering the mobile device to request one or more new network connectivity policies when the mobile device moves to a second location outside of the virtual region and determines that it does not have another virtual policy compliant with the second location, and
    policy expiration times for the one or more network connectivity policies:
  receiving, by the system from the mobile device, a request for the one or more new network connectivity policies responsive to the mobile device moving to the second location outside of the virtual region and determining that it does not have the other virtual policy compliant with the second location,
  identifying, by the system, the second location of the mobile device based on the request received from the mobile device;
  determining, by the system, a second virtual region that is an area surrounding the second location of the mobile device having the radius of the predefined size;
  accessing, by the system in response to the request, the plurality of predefined network connectivity policies that each recommend the plurality of access networks;
  identifying, by the system from the predefined network connectivity policies, the one or more new network connectivity policies that each recommend a plurality of new access networks that overlap with, and accordingly are valid for, the second virtual region, wherein the one or more of the new network connectivity policies are further identified based on the parameters;
  sending, by the system, to the mobile device:

the one or more new network connectivity policies for use by the mobile device in selecting one of the plurality of newly recommended access networks of any of the one or more new network connectivity policies for establishing a connection thereto, and
a second virtual policy including:
an indication of the second virtual region as a validity area for the second virtual policy which is for use in triggering the mobile device to request one or more further new network connectivity policies when the mobile device moves to a third location outside of the second virtual region and determines that it does not have a further virtual policy compliant with the third location, and
policy expiration times for the one or more new network connectivity policies.

6. A system comprising:
a memory system; and
one or more processing cores coupled to the memory system and that are each configured to:
identify, by the system, a location of a mobile device on a network based on a message received by the mobile device, wherein the system and the mobile device are remotely connected via the network;
determine, by the system, a virtual region that is an area surrounding the location of the mobile device having a radius of a predefined size;
access, by the system, a plurality of predefined network connectivity policies that each recommend a plurality of access networks;
identify, by the system from the predefined network connectivity policies, one or more of the network connectivity policies that each recommend a plurality of access networks that overlap with, and accordingly are valid for, the virtual region, wherein the one or more of the network connectivity policies are further identified based on parameters including:
subscriber information including information associated with the mobile device and a user of the mobile device, and
current usage information associated with the mobile device;
send, by the system, to the mobile device:
the one or more network connectivity policies for use by the mobile device in selecting one of the plurality of recommended access networks of any of the one or more network connectivity policies for establishing a connection thereto, and
a virtual policy including:
an indication of the virtual region as a validity area for the virtual policy which is for use in triggering the mobile device to request one or more new network connectivity policies when the mobile device moves to a second location outside of the virtual region and determines that it does not have another virtual policy compliant with the second location, and
policy expiration times for the one or more network connectivity policies;
receive, by the system from the mobile device, a request for the one or more new network connectivity policies responsive to the mobile device moving to the second location outside of the virtual region and determining that it does not have the other virtual policy compliant with the second location;
identify, by the system, the second location of the mobile device based on the request received from the mobile device;
determine, by the system, a second virtual region that is an area surrounding the second location of the mobile device having the radius of the predefined size;
access, by the system in response to the request, the plurality of predefined network connectivity policies that each recommend the plurality of access networks;
identify, by the system from the predefined network connectivity policies, the one or more new network connectivity policies that each recommend a plurality of new access networks that overlap with, and accordingly are valid for, the second virtual region, wherein the one or more of the new network connectivity policies are further identified based on the parameters;
send, by the system, to the mobile device:
the one or more new network connectivity policies for use by the mobile device in selecting one of the plurality of newly recommended access networks of any of the one or more new network connectivity policies for establishing a connection thereto, and
a second virtual policy including:
an indication of the second virtual region as a validity area for the second virtual policy which is for use in triggering the mobile device to request one or more further new network connectivity policies when the mobile device moves to a third location outside of the second virtual region and determines that it does not have a further virtual policy compliant with the third location, and
policy expiration times for the one or more new network connectivity policies.

* * * * *